United States Patent
Matsuo

(10) Patent No.: US 7,727,073 B2
(45) Date of Patent: Jun. 1, 2010

(54) COUPLING PLATE FOR ENGINE-DRIVEN GENERATOR

(75) Inventor: Seiji Matsuo, Kawagoe (JP)

(73) Assignee: Denyo Kabushiki Kaisha, Tokyo-To (JP)

( * ) Notice: Subject to any disclaimer, the term of this patent is extended or adjusted under 35 U.S.C. 154(b) by 297 days.

(21) Appl. No.: 11/500,503

(22) Filed: Aug. 8, 2006

(65) Prior Publication Data

US 2008/0016930 A1   Jan. 24, 2008

(30) Foreign Application Priority Data

Jul. 19, 2006   (JP) ............... 2006-197227

(51) Int. Cl.
  *F16D 3/77* (2006.01)
(52) U.S. Cl. ..................... 464/99; 464/180
(58) Field of Classification Search ............ 464/98, 464/99, 137, 180, 127
  See application file for complete search history.

(56) References Cited

U.S. PATENT DOCUMENTS

| 3,976,103 A | * | 8/1976 | Ostic | |
| 4,092,837 A | * | 6/1978 | Gebauer et al. | ............ 464/85 |
| 4,218,097 A | * | 8/1980 | Olinger et al. | ............ 301/5.21 |
| 4,737,136 A | * | 4/1988 | Federn | ............ 464/99 |
| 5,457,883 A | * | 10/1995 | Swenson, Sr. | ............ 29/888.01 |
| 5,762,558 A | * | 6/1998 | Takehira | ............ 464/68.1 |
| 5,938,533 A | * | 8/1999 | Watanabe | ............ 464/98 |
| 6,234,906 B1 | * | 5/2001 | Jordan et al. | ............ 464/93 |

FOREIGN PATENT DOCUMENTS

| EP | 0 082 797 A2 | * | 6/1983 | ............ 464/99 |
| GB | 2 159 240 A | * | 11/1985 | ............ 464/99 |
| JP | 61-74271 | | 5/1986 | |
| JP | 09-298863 | | 11/1997 | |

* cited by examiner

*Primary Examiner*—Greg Binda
(74) *Attorney, Agent, or Firm*—Jacobson Holman PLLC

(57) ABSTRACT

A coupling plate for an engine-driven generator on which a balance weight can be mounted and which is simple in structure and is constituted by a same hole making pattern. In a coupling plate for an engine-driven generator driving a generator by an engine, a plurality of elastic disks overlapped integrally are provided, and the elastic disks have one of the inner circumference side and the outer circumference side in the radial direction connected to the engine and the generator as the input side and the other as the output side, and in each of the elastic disks, a plurality of holes including small-diameter weight mounting holes and large-diameter weight escape holes distributed/arranged with a predetermined interval in the circumferential direction are drilled so that the holes of the respective disks are positionally overlapped with each other.

4 Claims, 5 Drawing Sheets

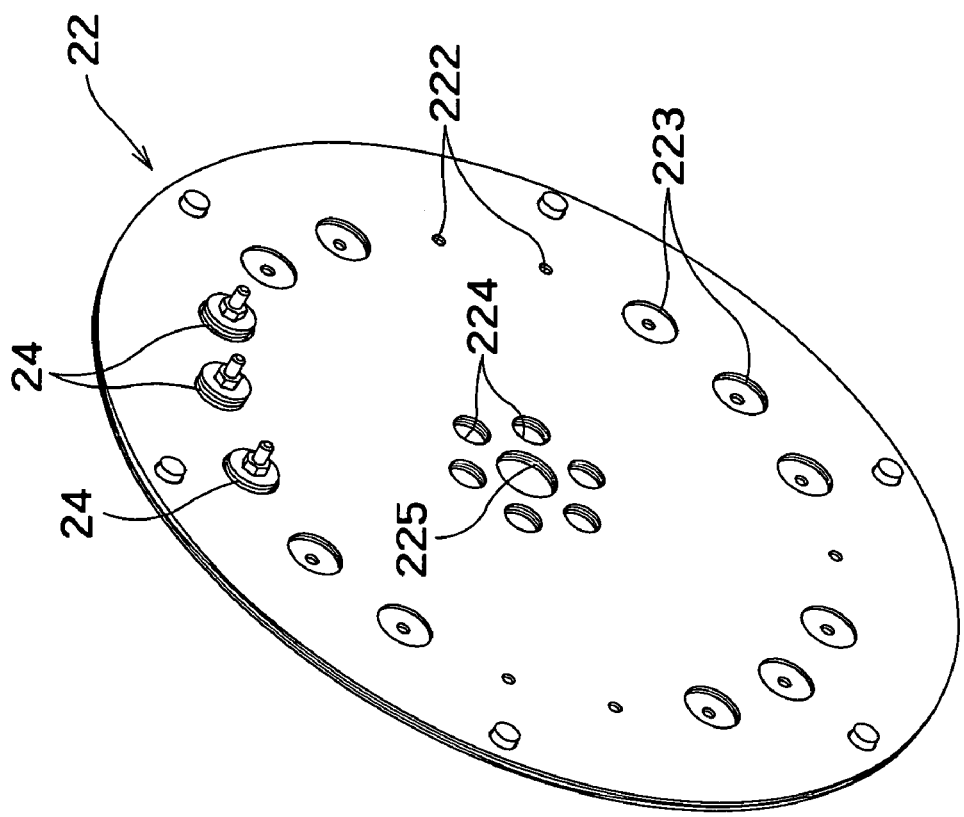
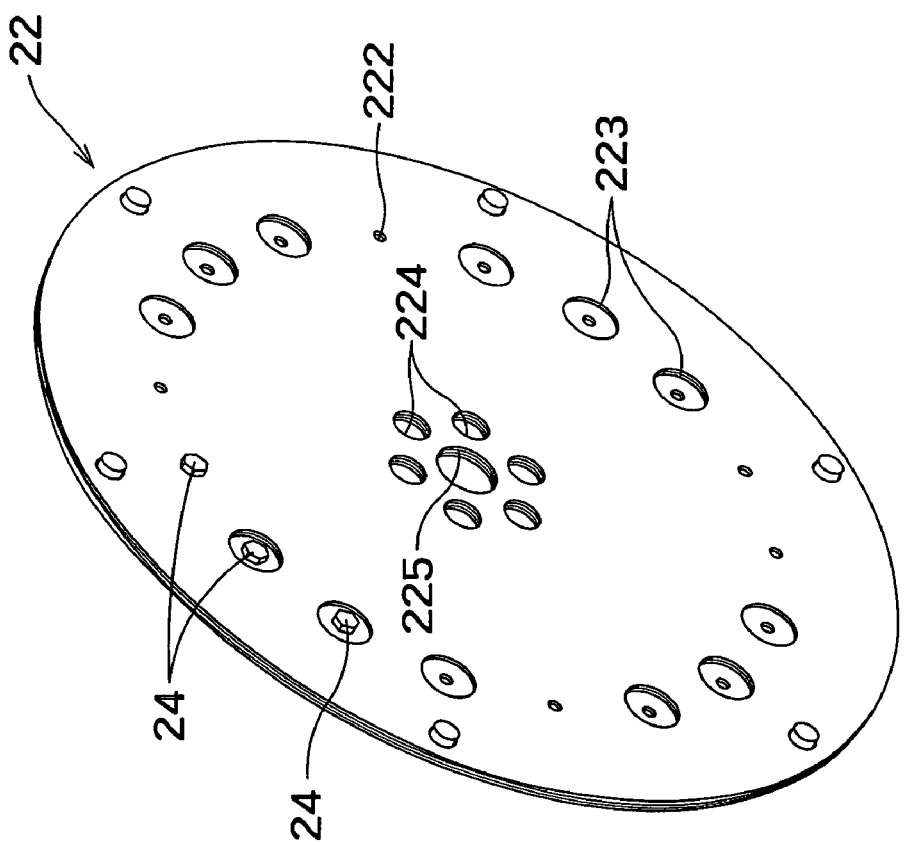

COUPLING PLATE FOR ENGINE-DRIVEN GENERATOR

BACKGROUND OF THE INVENTION

1. Field of the Invention

The present invention relates to a coupling plate for rotating electric machine and particularly to a coupling plate used in an engine-driven generator for connecting the engine to the generator.

2. Related Art

The engine-driven generator is to drive a generator by obtaining a driving force from an engine. However, since an engine generates axial vibration which is harmful for driving together with a torque required for driving of the generator, a coupling plate is interposed between the engine and the generator to transmit only the torque (a plate between a cooling fan 8 and a disk 9 in the Patent Document 2, FIG. 3).

Also, a rotating electric machine generates vibration if a rotor is not balanced, which causes a problem of damage on a bearing, generation of a noise, reduction of machine life and so on. Then, in order to achieve a balance, a balance weight is attached on a rotor after assembling of the rotor.

And in order to achieve a rotating balance of rotating electric machine, a disk for mounting the balance weight at a rotating shaft is provided and the balance is fixed by selecting an appropriate position on this disk (See the Patent Documents 1 and 2).

[Patent Document 1] Japanese Utility Model Laid-Open No. S61-74271

[Patent Document 2] Japanese Patent Laid-Open No. H9-298863

Here, the rotating electrical machine is now required to reduce its size and weight and to simplify the structure as a general request for electrical machine, and particularly reduction in the number of parts and the length in the axial direction is in demand. Therefore, there is a demand to reduce the number of members to be mounted on a shaft of rotating electrical machine as much as possible.

Therefore, the above incorporation of a disk only to mount a balance weight onto a shaft of rotating electrical machine is a problem to be improved in machine design.

The present invention was made in view of the above and its object is to provide a coupling plate on which a balance weight can be mounted and which can maintain a function to absorb natural axial vibration with a simple structure.

SUMMARY OF THE INVENTION

In order to achieve the above object, the present invention provides a coupling plate for an engine-driven generator for driving a generator by an engine, including:

a plurality of elastic disks integrally overlapped, wherein the elastic disk has either of its radial inner circumference or outer circumference side as an input side and the other as an output side connected to the driving source and the rotating electrical machine, and each of the elastic disks has a plurality of holes including a small-diameter weight mounting hole and a large-diameter weight escape hole distributed/arranged with a predetermined interval in the circumferential direction so that the holes of the respective disks are overlapped with each other at the respective positions.

In the present invention, as mentioned above, since the small-diameter weight mounting hole and the large-diameter weight escape hole are provided at each of the plurality of elastic disks overlapped integrally and these holes are aligned as appropriate for use, a balance weight can be mounted at the coupling plate. As a result, a balance-weight mounting plate which has been required can be omitted.

BRIEF DESCRIPTION OF THE DRAWINGS

FIGS. 5A and 5B are perspective views of a front side and a back side showing a mounting state of a balance weight to the coupling plate.

DETAILED DESCRIPTION OF THE INVENTION

An embodiment of the present invention will be described below referring to the attached drawings.

First Embodiment

Figure 1:
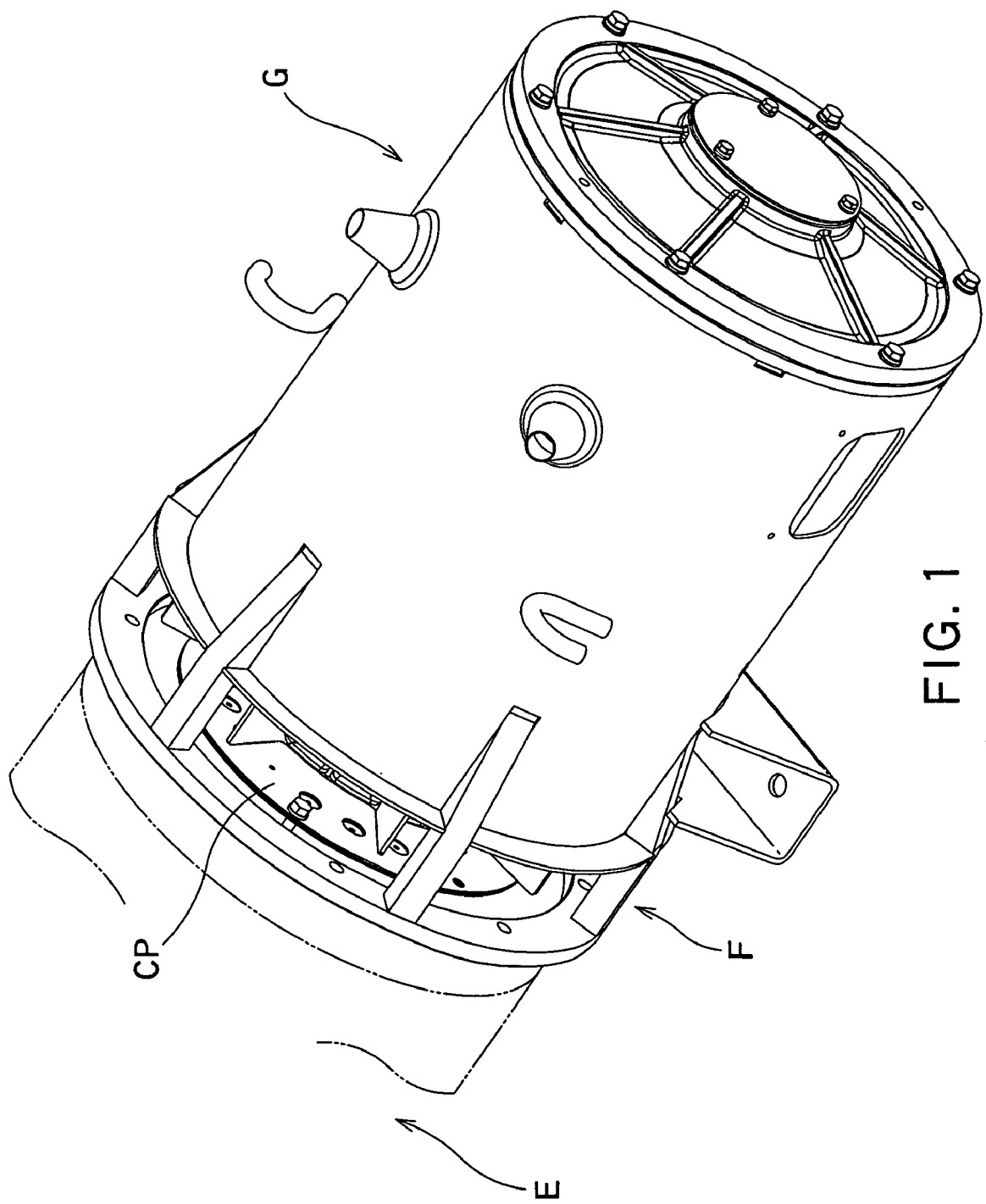
FIG. 1 is an explanatory view showing a construction of a target of application of the present invention.

FIG. 1 is a perspective view showing an appearance of a generator "G" to which the present invention is applied. As shown in FIG. 1, the generator "G" is driven by an engine "E", and at a portion of the generator "G" close to the engine, a cooling fan "F" and a coupling plate "CP", which is also referred to as a laminate plate and a connecting member with a vibration absorbing function, are provided. Thus, internal cooling of the generator "G" is performed, and a vibration is eliminated from a driving force of the engine "E" and a torque is transmitted to the generator "G".

Figure 2:
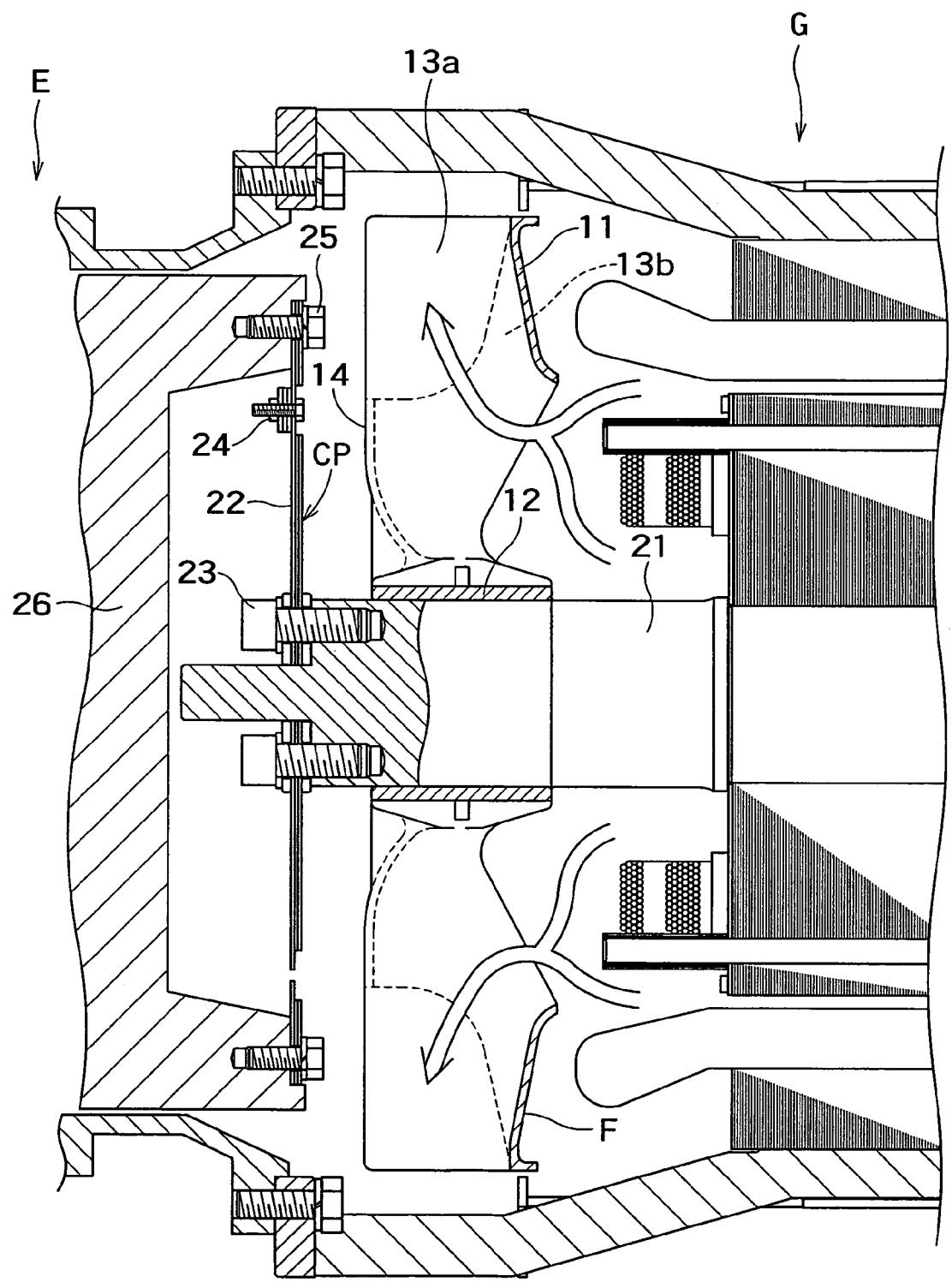
FIG. 2 is a longitudinal sectional view showing an embodiment of the present invention.

FIG. 2 is a longitudinal sectional view showing a connection portion between the generator "G" and the engine "E" in an enlarged manner. In FIG. 2, the cooling fan "F" is mounted at a rotating shaft 21 of the generator. To the rotating shaft 21, a coupling plate 22 is fixed by a fixing bolt 23, and to the coupling plate 22, a balance weight 24 is mounted and fixed to a fly wheel 26 by a bolt 25.

Thus, the torque from the engine, not shown, is stabilized by the fly wheel 26, the axial vibration is suppressed by the coupling plate 22 constituted by an elastic material, and a rotating balance is achieved by the balance weight 24 and transmitted to the generator through the rotating shaft 21.

By rotation of the engine, not shown, the rotating shaft 21 and the cooling fan "F" are rotated and a cooling air shown by a flow line with an arrow flows along an air channel in the radial direction formed by a main plate 11, a side plate 14 and an impeller plate 13. The cooling air is an air flow along the axial direction of the generator by a negative pressure generated with centrifugal diffusion action of air by the cooling fan "F".

Here, the impeller blade 13b has its portion opposite to the hub gouged and in the case shown in the figure, a space is formed at a portion close to the outer circumference of the coupling plate 22. A tool can be inserted using the space for fastening work of the bolt 25.

Figure 3:
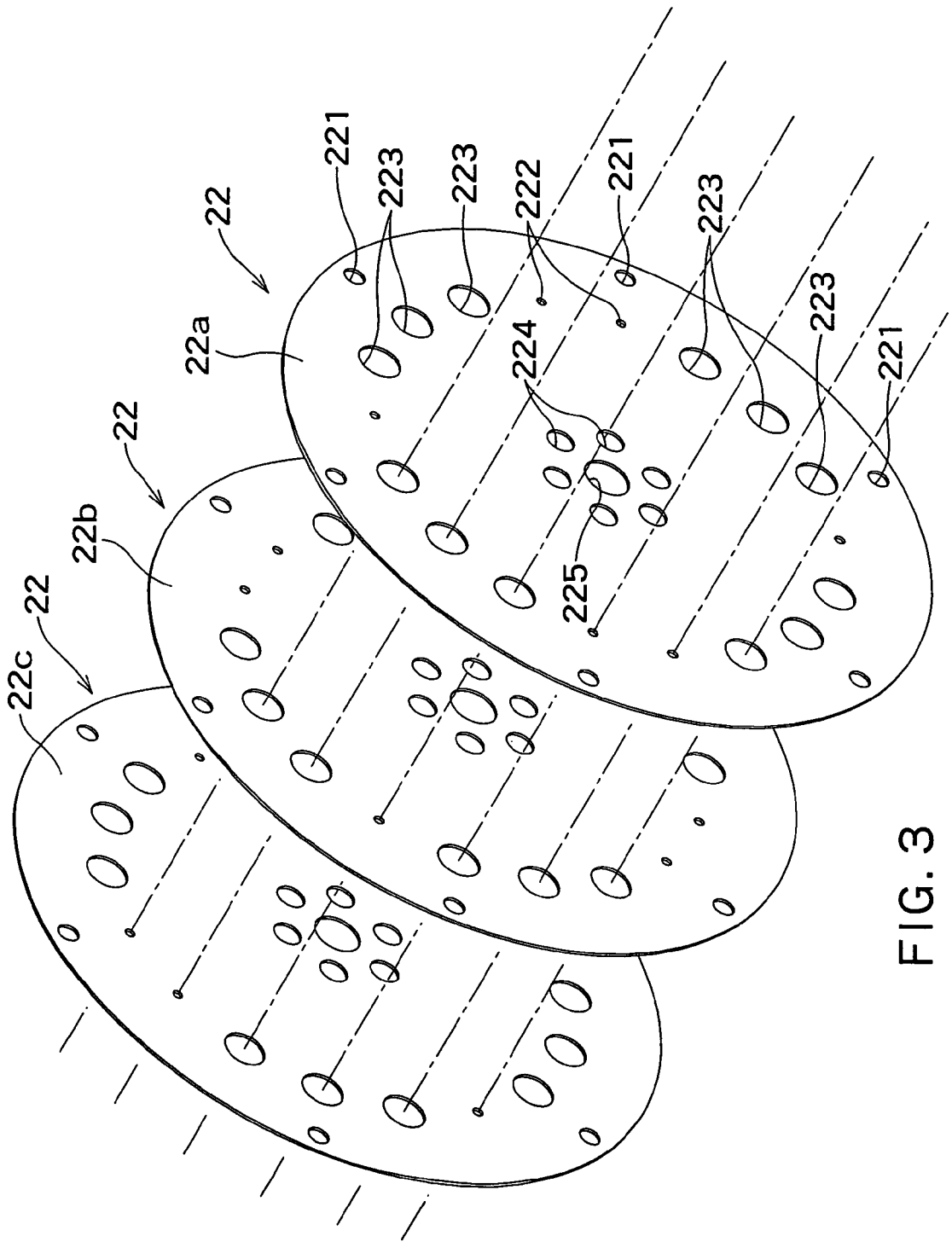
FIG. 3 is an exploded perspective view of a coupling plate in the embodiment in FIG. 2.

FIG. 3 is a perspective view showing the coupling plate 22 in an exploded manner. Here, three plates with the same hole making pattern are integrally overlapped while being displaced by 120 degrees so as to constitute the coupling plate 22.

That is, as shown in FIG. 3, the three coupling plates 22 have the same hole making pattern but when they are displaced by 120 degrees and overlapped with each other, 18 balance-weight mounting holes 222 on any one of the coupling plates 22 are distributed/arranged with an interval of 20 degrees on the entire circumference, while the other two coupling plates 22 corresponding to the balance-weight mounting holes 222 have balance-weight escape holes 223.

When the center line of the balance-weight mounting holes 222 or the balance-weight escape holes 223 in FIG. 3 is followed, the balance-weight mounting hole 222 is passed through in one coupling plate and the balance-weight escape hole 223 is passed through in the other two coupling plates.

And on any of the coupling plates 22, six input-side mounting holes 221 on the outer circumference, the balance-weight mounting holes 222 and balance-weight escape holes 223 close to the outer circumference, six output-side mounting holes 224 on the inner circumference and a center hole 225 at the center into which the end of the rotating shaft of the generator is inserted are distributed/arranged, respectively.

Figure 4:
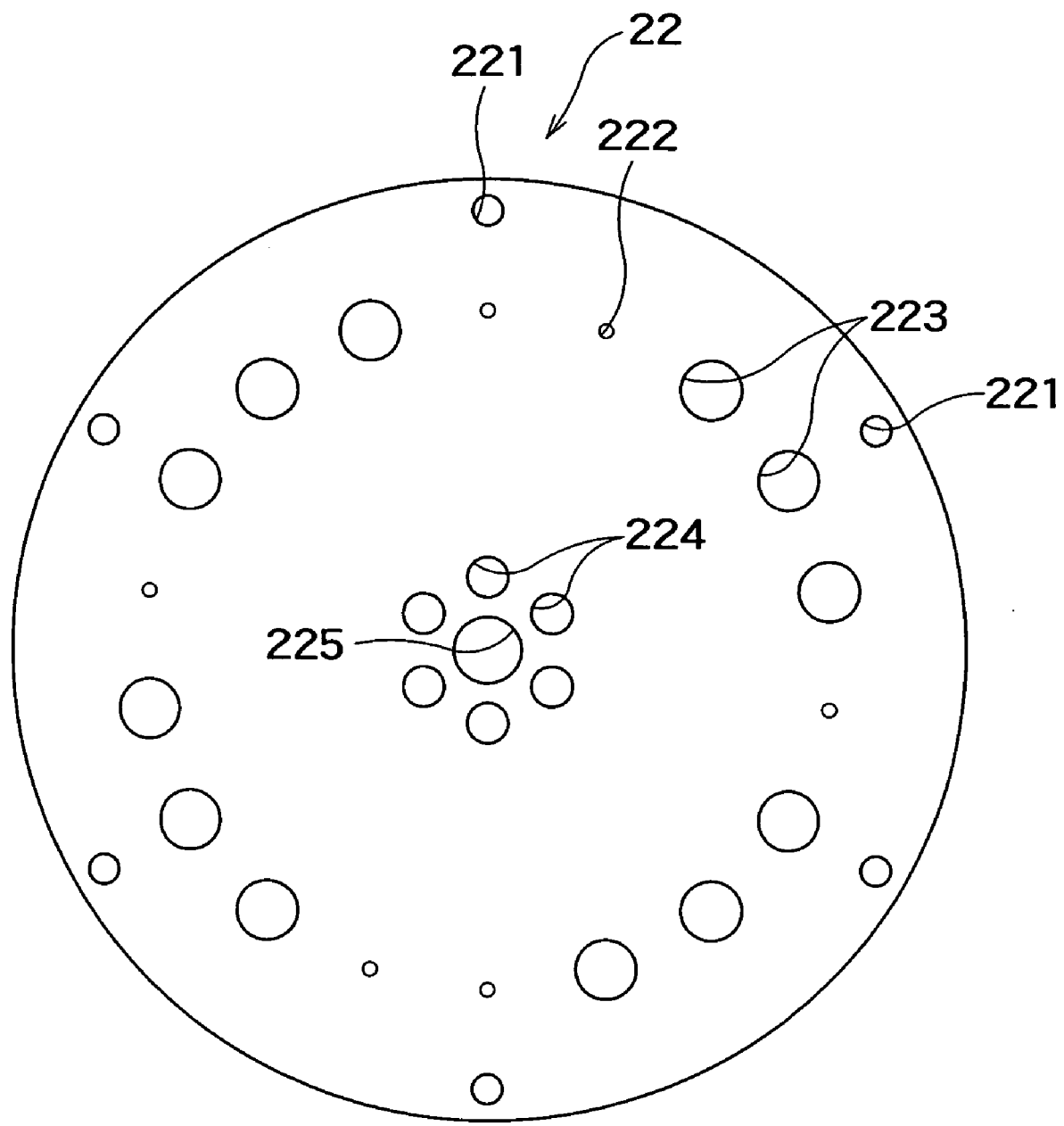
FIG. 4 is a front view of the coupling plate in the embodiment in FIG. 2.

FIG. 4 is a front view showing arrangement situation of each hole in one coupling plate 22. As shown in FIG. 4, the input-side mounting holes 221 and the output-side mounting holes 224 are evenly arranged in six each with an interval of 60 degrees.

On the other hand, three balance-weight escape holes 223 are grouped with an interval of 20 degrees on the circumference of the same circle, two groups each being arranged in symmetry with an interval of 40 degrees, and one balance-weight mounting hole 222 is arranged between each group at a location of 40 degrees and two balance-weight mounting holes 222 between the other groups at a location of 60 degrees with an interval of 20 degrees.

In this way, any of the balance-weight mounting holes 222 and the balance-weight escape holes 223 are arranged with an equal interval (20-degree interval) on the same circumference. Therefore, the three coupling plates are in the positional relation that positions of the two balance-weight escape holes overlap one balance-weight mounting hole when the positions of the mounting holes 221 are aligned.

Therefore, the balance weight mounting position on the coupling plate 22 can be selected from 18 locations with an interval of 20 degrees, and for the coupling plate 22 on which the balance weight is mounted, the one with the balance-weight mounting hole at an appropriate position is selected from the three plates.

FIGS. 5A and 5B are perspective views showing the front side and the back side of the coupling plates 22 on which the balance weights 24 are mounted as appropriate. In this case, three balance weights 24 are mounted. And in FIG. 5A, bolt heads of the respective three balance weights 24 are seen, while in FIG. 5B, nuts of the respective balance weights 24 are seen.

Though it is not necessarily clear from FIGS. 5A and 5B, the balance weights 24 are mounted at only one of the three coupling plates, while the other two enter their balance weight escape holes and are not fixed to those two coupling plates.

Therefore, the balance weight acts particularly on a single coupling plate and does not give adverse effect to axial vibration absorbing action, which is a main role of the coupling plates. Also, shearing stress can be prevented from being applied to the mounting bolts of the balance weights.

Another Embodiment

In the above embodiment, screwing-type balance weight was shown, but there is a balance weight of lead or the like of the attachment method not using a screw, and the shape and arrangement of holes may be changed as appropriate.

Also, the number of coupling plates is not limited to three but the number of plates may be any required for transmission of a torque.

What is claimed is:

1. A coupling plate for an engine-driven generator driving a generator by an engine, comprising:
    a plurality of elastic disks integrally overlapped,
    said elastic disks having one of a radial inner circumference side and an outer circumference side as an input side and the other of the radial inner circumference side and the outer circumference side as an output side connected to said engine and said generator, and
    each of said elastic disks has a plurality of holes including a small-diameter balance weight mounting hole for mounting a balance weight and a large-diameter weight escape hole arranged at a radial position on the disks with a predetermined interval in a circumferential direction so that the holes of the respective disks are overlapped with each other at respective positions.

2. The coupling plate for an engine-driven generator according to claim 1, wherein said plurality of elastic disks include a same hole making pattern.

3. The coupling plate for an engine-driven generator according to claim 1, wherein said small-diameter balance weight mounting hole and said large-diameter weight escape hole are arranged with a predetermined interval in a same radial position.

4. The coupling plate for an engine-driven generator according to claim 1, wherein said small-diameter balance weight mounting hole is provided with a balance weight.

* * * * *